United States Patent
Reiter et al.

(10) Patent No.: US 7,427,251 B2
(45) Date of Patent: Sep. 23, 2008

(54) DRIVE CHAIN FOR A BICYCLE

(75) Inventors: Markus Reiter, Schweinfurt (DE); Pedro Santos, Coimbra (PT)

(73) Assignee: SRAM Deutschland GmbH, Schweinfurt (DE)

( * ) Notice: Subject to any disclaimer, the term of this patent is extended or adjusted under 35 U.S.C. 154(b) by 14 days.

(21) Appl. No.: 10/112,381

(22) Filed: Mar. 29, 2002

(65) Prior Publication Data

US 2002/0173395 A1 Nov. 21, 2002

(30) Foreign Application Priority Data

Mar. 29, 2001 (DE) .................. 101 15 628
Dec. 5, 2001 (DE) .................. 101 59 773

(51) Int. Cl.
*F16G 13/02* (2006.01)
*B21L 9/04* (2006.01)

(52) U.S. Cl. .................. 474/231; 474/206; 474/228; 474/234; 59/4; 59/5

(58) Field of Classification Search .................. 474/231, 474/226, 206, 207, 213, 220, 209, 234, 230, 474/229, 223, 225, 228, 218, 254; 305/202, 305/201, 20; 303/185, 220; 72/256; 470/148; 59/4–5, 85; 29/512, 523, 525; 285/216, 285/222; 411/178, 181

See application file for complete search history.

(56) References Cited

U.S. PATENT DOCUMENTS

| | | | | |
|---|---|---|---|---|
| 713,102 | A * | 11/1902 | Hunt | 474/213 |
| 3,540,255 | A * | 11/1970 | Hanna | 72/256 |
| 3,754,731 | A * | 8/1973 | Mackal et al. | 29/512 |
| 4,092,773 | A * | 6/1978 | Donahue | 29/512 |
| 4,978,327 | A | 12/1990 | Wu | |
| 4,998,907 | A * | 3/1991 | Sawada et al. | 474/206 |
| 5,092,724 | A * | 3/1992 | Muller | 411/179 |
| 5,291,730 | A * | 3/1994 | Wu | 59/85 |
| 5,305,594 | A * | 4/1994 | Wang | 59/85 |
| 5,362,282 | A | 11/1994 | Lickton | 474/220 |
| 5,461,852 | A * | 10/1995 | Nagamatsu | 59/5 |
| 5,741,196 | A * | 4/1998 | Campagnolo | 474/226 |
| 6,110,064 | A * | 8/2000 | Guichard | 474/231 |
| 6,270,173 | B1 * | 8/2001 | Hashimoto et al. | 305/202 |

FOREIGN PATENT DOCUMENTS

| | | | | |
|---|---|---|---|---|
| DE | 3815502 A | * | 11/1989 | |
| DE | 91 01 113 U1 | | 5/1991 | |
| EP | 1267093 A1 | * | 12/2002 | |
| FR | 974976 | | 2/1951 | |
| FR | 02148 A2 | * | 3/1987 | 474/254 |
| FR | 2 652 627 | | 9/1989 | |
| FR | 0666434 A1 | * | 8/1995 | |
| FR | 2 753 512 | | 9/1996 | |
| GB | 838115 | | 6/1960 | |
| GB | 2253890 A | * | 9/1992 | |
| GB | 2257221 A | * | 1/1993 | |
| JP | 52-6860 A | * | 1/1977 | 474/218 |
| JP | 04-41039 A | * | 2/1992 | |
| JP | 04-306385 A | * | 10/1992 | 292/263 |

* cited by examiner

*Primary Examiner*—Marcus Charles
(74) *Attorney, Agent, or Firm*—Milan Milosevic; Lisa Sardynski

(57) ABSTRACT

A roller chain for bicycles having outer and inner chain links. The outer and inner chain links have outer and inner link plates, respectively. The chain links are joined by tubular pins. The chain links have holes for receiving the tubular pins. The holes have an outward-opening conical contour for receiving a deformed head of the pin. The roller chain is assembled into a working unit by using a closing link to join two inner chain links. The closing link can be assembled and dismantled without plastic deformation or press-fitting forces on the closing link. The configuration of the hole contour and deformed heads allows the outer link plates to enter into a connection with the pins such that a slight movement of the pin in its seat in the hole in the outer link plate.

24 Claims, 6 Drawing Sheets

Prior Art

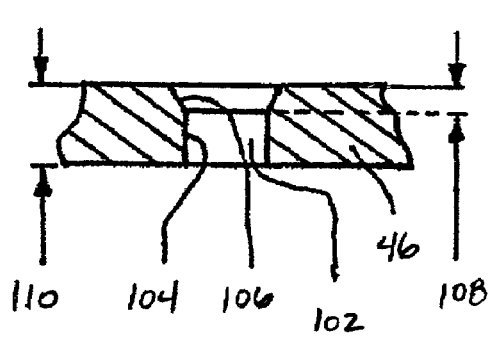
Fig. 8
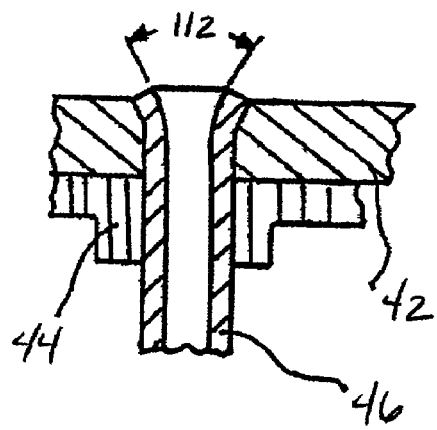
Fig. 9
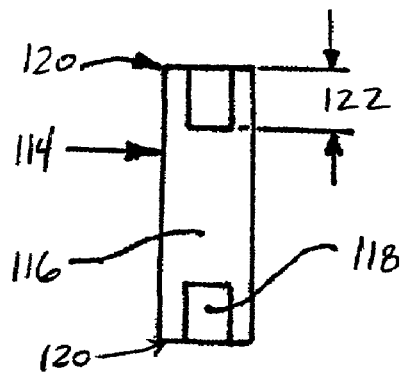
Fig. 10
Fig. 11
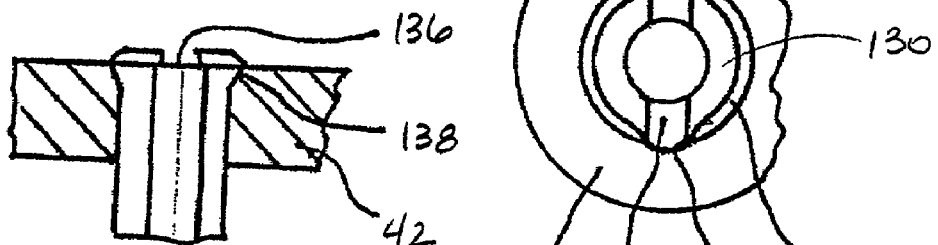
Fig. 12
Fig. 13
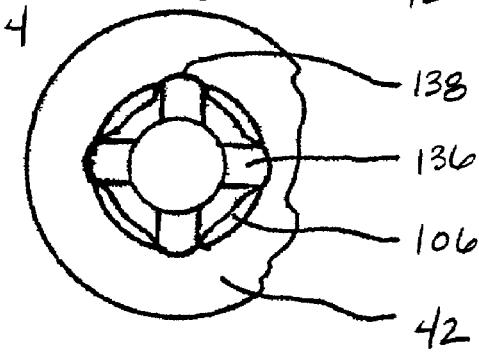
Fig. 14

DRIVE CHAIN FOR A BICYCLE

BACKGROUND OF INVENTION

This invention relates to a drive chain and more particularly to a bicycle roller chain that prevents the pin connection from rupturing under lateral forces.

It is known in the art to provide a roller chain that has a plurality of interconnected chain links that form a drive element between two gear wheels to drive a bicycle. For example, a French patent, FR2753512, discloses a chain for bicycles, which includes chain links having outer link plates and inner link plates. Each plate has holes for receiving pins that connect the links together. '512 discloses a lightweight drive chain while still providing adequate load bearing capacity. The weight of the chain is lightened in two ways. First, the outer link plate point is provided with an opening disposed in the middle of the outer link plate which also reduces the external contour of the outer link plate. Second, the pin is made hollow. The pin is made from tube stock and is pressed into the holes of the outer link plates and inner link plates. After being pressed into the holes, the pin is riveted to increase its press fit in the outer link plate, resulting in a slight expansion of the hole at the outer edge of the hole in the outer link plate. Such an expansion usually occurs, whether the pin is made from solid stock or tube stock because of the act of riveting it.

A problem associated with riveting the pins is that the connection between the pins and the link plates may ruptured under lateral forces that occur when changing from a first gear to a second gear which is not aligned with the first gear. Due to these forces, the riveted end of the pin is pulled through the hole of the outer link plate. Thus, merely riveting the pin in the outer link plate does not prevent the destruction of the roller chain under high operating loads. Therefore, there is a need for a roller chain having a configuration that prevents the end of the pin from being pulled through the hole of the outer link plate.

Further, when designing a roller chain to be used with a gear set on the rear axle of the bicycle, it is important that the configuration of the roller chain allows the smallest possible interval between the gears in order to accommodate a maximum number of sprockets on the rear axle. This can be accomplished by having components that do not project over the external surface of the roller chain, which is essentially defined by the outer surface of the outer link plate. One component that usually protrudes beyond the outer surface of the outer link plates is the pin. The pin usually has an edge that projects beyond the external surface of the outer chain link. Further, the edges of the pin may get caught on the toothing of an adjacent gear, especially a larger gear, and may give rise to unintended gear shifts or noises.

There is a need for a roller chain that has a configuration that prevents the rupture of the pin connection under lateral forces and has a narrow design to permit a maximum number of chain sprockets on the rear axle of the bicycle.

SUMMARY OF INVENTION

The present invention provides a roller chain having a connection between the head or end of the pin and the outer link plate that is modified to give an improved interlocking connection. The configuration of the present invention prevents the head of the pin from being pulled through the hole in the outer link plate. This is achieved by having a hole in the outer link plate that has an outward-opening conical shape rather than just a cylindrical shape. Although this hole configuration forms a press fit with the pin at its inward narrowest point, the outward extending contour of the hole provides an increasing clearance in relation to the pin. The pin is riveted and the head of the pin fills the free space defined by the clearance.

If round or solid stock is used for the pin, the riveting must be performed by a wobble riveting method. Otherwise, conventional riveting would modify the diameter of the entire pin, resulting in the inner chain links becoming fixed on the pin and would adversely affect the functioning of the roller chain.

If tube stock is used to make the pin, a more cost-effective riveting method may be used and in addition the tube stock has a lighter weight. A stamping tool is used to rivet the pin. The stamping tool has two punches which approach the pin axially from both sides and expand the heads of the pin from the inside diameter outward. Each punch has an insertion diameter, an expansion cone, and a calibration surface for determining the length of the pin. The expansion cone may be experimentally adjusted to the contour of the hole to vary the tightness of the press fit of the head of the pin along the funnel-shaped hole. A clearance between the pin and the hole may range from zero to a specific clearance that allows the outer link plates and the pins to form a rectangle under no load and to form a parallelogram under load.

As stated above, conventional roller chains react to lateral forces by the inner chain link being deflected onto their pins which produces a wear-promoting edge load. This occurs for the first time when changing the first gear of a nonaligning gear pair and for a second time when running on to the second gear on the other side of the pin. The present invention eliminates this problem by providing the previously described parallelogram which prevents the edge load and thus reduces wear.

In another embodiment of the present invention, a hole in the outer link plate has a cylindrical section and a tapered section. The tapered section is closest to the outer surface of the outer link plate. The tapered section has a length approximately equal to one third of a thickness of the outer link plate. Preferably, when the pin is made from tube stock, the stamping tool has an expansion cone that produces a tapered angle between 55° and 65°.

Alternatively, a tubular pin may have a solid middle section and hollow sections at the heads of the pin may be used. The length of the hollow sections are equal to the length of the tapered section in the hole of the outer link plate. The deformation of the head of the pins made from tube stock in order to produce a reliable contact with tapered section of the hole in the outer link plate may be achieved by a combination stamping and wobble riveting method. In this case punches are used which have an expansion cone with a smaller angle, but which after stamping of the pin are then set into a wobbling motion, in order to produce the required tapered angle of 55° to 65° at the head of the pin.

In another embodiment of the present invention, the pin may be fixed in the outer link plate by stamping the head of the pin transversely over a face of the head of the pin, resulting in two opposing embossings produced by surface contact pressure on the peripheral area of the tapered section of the hole in the outer link plate. With this configuration, the pin is able to perform a slight swiveling movement in relation to the outer link plate about the connecting axis of the two contact surfaces. The swiveling movement prevents the low-wear operation of the drive chain in the case of nonaligning chain sprockets. Alternatively, the head of the pin may be expanded irregularly using non-round punches, making it also possible to produce two opposing contact embossings between the head of the pin and the outer link plate. In the same way that two contact embossings may be produced, it is possible to produce three or four symmetrically arranged contact embossings by surface contact pressure.

Since the pins of the present invention have a greater thickness than the prior art it is no longer possible to press a pin out of the roller chain for the purpose of opening and/or dismantling the roller chain. If the roller chain is to be opened, at least two heads of two pins must be ground off in order to expose the two inner chain links needed for the connection. Thus to solve this problem, a closing link disclosed in the U.S. Pat. No. 5,362,282, entitled "MASTER CHAIN LINK" may used in combination with the roller chain of the present invention.

The closing link includes first and second elements. Each of the elements has a closing link plate and a closing pin which are pressed together to form a L-shaped element. When two inner chain links are connected together to close the roller chain, the closing pin of the first L-shaped element is inserted into the first inner chain link and the closing pin of the second L-shaped element is inserted into the second inner chain link from the opposite direction and at the same time pushed through openings in the respective closing link plates situated opposite.

Alternatively, the closing link may be constructed according to the French patent, FR2652627 (Reg. Nat. 89 12752), entitled "ACCESSOIRE DE JONCTION POUR CHAINE DE TRANSMISSION." The closing link includes a first element and a second element. An outer chain link is connected to an inner chain link by pressing the first element and the second element into one another. The first and second elements occupy the same space as a pin. To make the edge of the closing link flush with the outer chain link, the first and second elements have flat heads that fit within indents disposed in an outer surface of the outer chain link. With this configuration, no harmful edges are produced that might adversely affect the gear shift quality of the roller chain.

In a specific embodiment of the present invention, the configuration of the roller chain is narrowed by providing the outer link plates with a middle section that has an indent on a side facing the inner link plate. The indent lies in a plane perpendicular to the longitudinal direction of the chain. Also, since a gear shift almost always occurs due to the outer link plate catching teeth of the adjacent gear, this works all the better the further outward the inside of the outer link plate is at the point of contact.

In a specific embodiment of the present invention, the pin has a stop located a distance from a face of the head of the pin. The distance equals the thickness of the outer link plate. The area of the pin in the outer link plate has a smaller diameter than a diameter of an area of the pin in the inner link plate and a hole of the inner link plate. This configuration facilitates the assembly of the roller chain in mass production.

The object of the present invention is to provide a roller chain that affords increased security against the parting of the connection between the outer link plates and pins under increased loading by lateral forces and has a closing link that allows the roller chain to be opened and closed as often as required. Another object of the present invention is to provide a narrow roller chain that permits a maximum number of chain sprockets on the rear axle of the bicycle.

These and other features and advantages of the invention will be more fully understood from the following description of certain specific embodiments of the invention take together with the accompanying drawings.

BRIEF DESCRIPTION OF DRAWINGS

In the drawings:

FIG. 8 is a partial cross-sectional view of the outer link plate in accordance with a specific embodiment of the present invention;

FIG. 9 is a partial cross-sectional view of a pin inserted into the chain links in accordance with a specific embodiment of the present invention;

FIG. 10 is a cross-sectional view of a pin having a solid middle section in accordance with a specific embodiment of the present invention;

FIG. 11 is a partial cross-sectional view of a hole of the outer link plate in accordance with a specific embodiment of the present invention;

FIG. 12 is a top view of a pin having an embossment running transversely over its end face that is disposed in the hole of FIG. 11;

FIG. 13 is a partial cross-sectional view of a hole of the outer link plate in accordance with a specific embodiment of the present invention;

FIG. 14 is a top view of a pin with a cruciform embossment that is disposed in the hole of FIG. 13;

DETAILED DESCRIPTION

Figure 1:
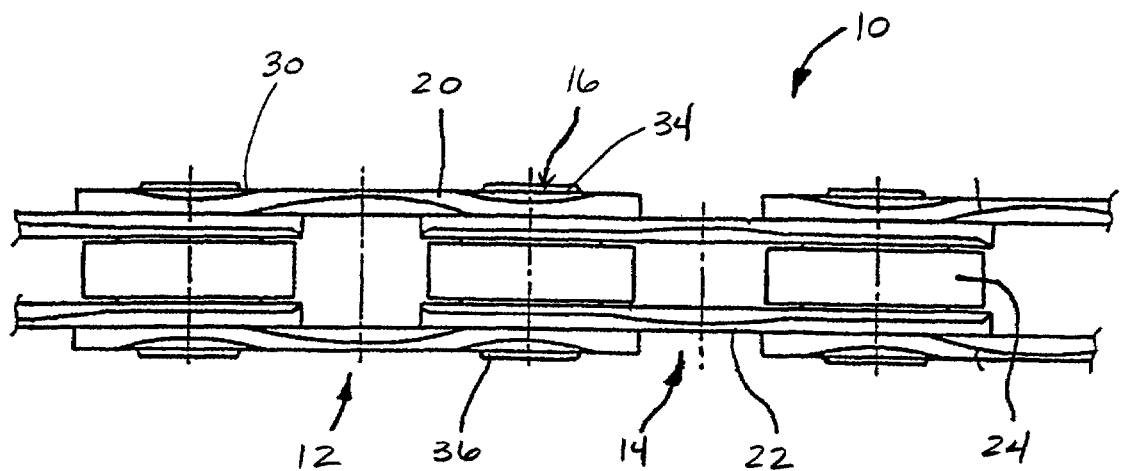
FIG. 1 is a partial view of a prior art roller chain.
Figure 2:
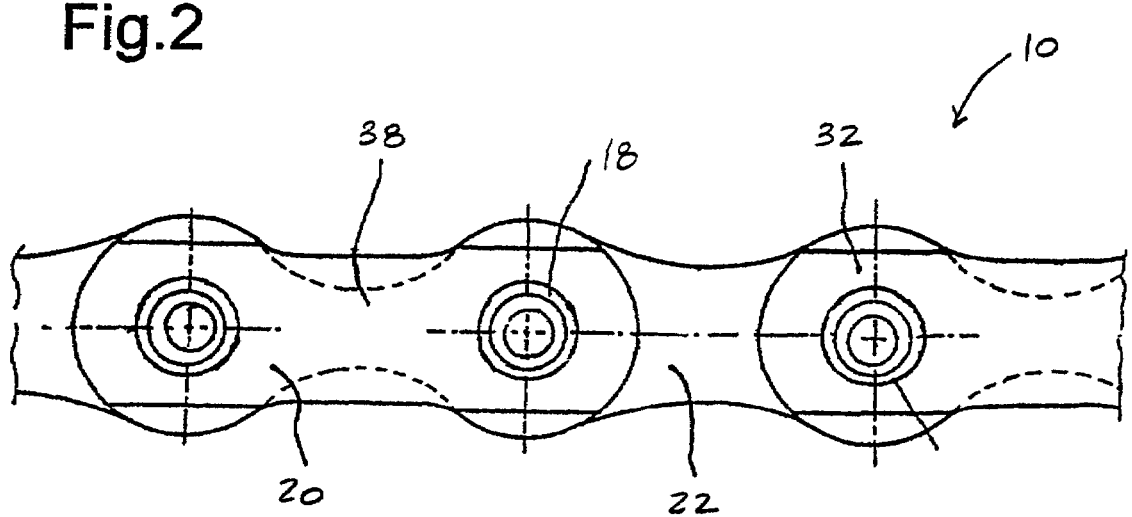
FIG. 2 is a partial view of the prior art roller chain of FIG. 1 rotated 90 degrees.

Referring to FIGS. 1 and 2 of the drawings, numeral 10 generally indicates a prior art roller chain for a bicycle. The chain 10 generally includes outer chain links 12 and inner chain links 14 which are pivotally connected by tubular pins 16, 18. The outer chain links 12 have outer link plates 20 and the inner chain links have inner link plates 22. Rollers 24 may interact with teeth of gears 26, 28, shown in FIG. 7, and may be arranged around the pins 16, 18. The plates 20, 22 are provided with holes 30 at their circular ends 32. The pins 16, 18 extend through and project out of the holes 30. The pins 16, 18 are externally riveted at their ends 34, 36 during the assembly of the roller chain 10. While the pin 16 is made of round stock, pin 18 is made of tube stock, as provided in the roller chain 10 in FIG. 2. A narrow middle part 38 which determines the axial position of the roller chain 10 on the teeth of the gears 26, 28, extends between the two circular ends 32 in each of the outer link plates 20 and the inner link plates 22.

Figure 3:
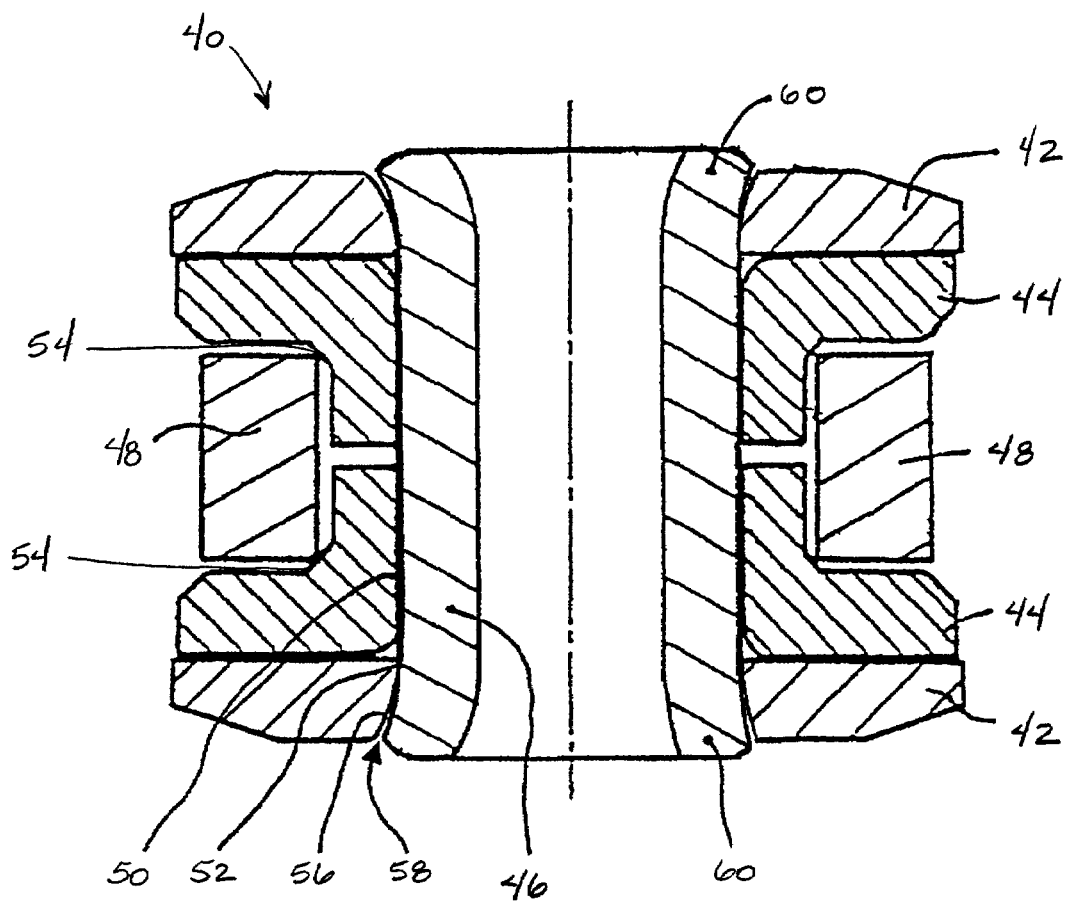
FIG. 3 is a cross-sectional view of a roller chain in accordance with a specific embodiment of the present invention

FIG. 3 illustrates a partial cross section of a roller chain 40 in accordance with a specific embodiment of the present invention. The chain 40 includes outer link plates 42 and inner link plates 44. A tubular pin 46 connects the links together. The pin 46 is made of tube stock. A roller 48 is arranged around the pin 46. The inner and outer link plates have centrally located holes 50, 52, respectively, for receiving the pin 46. The pin 46 is enclosed by a large bearing surface of the holes 50 of the inner link plates 44 and the rollers 48. The large bearing surface is a result of bends 54 in the inner link plates 44. The rollers 48 are supported on the bends 54. The holes 52 of the outer link plates 42 have a contour 56 which opens outward in a conical or funnel shape. A clearance 58 is formed between the holes 52 and heads 60 of the pin. The clearance 58 increases in an outward direction. The heads 60 of the pin are wider than the inside diameter of the pin 46. However, the heads 60 are just wide enough to allow the clearance 58 to equal a value in the micron range, in order to obtain a restricted mobility of a press-fit connection.

Figure 6:
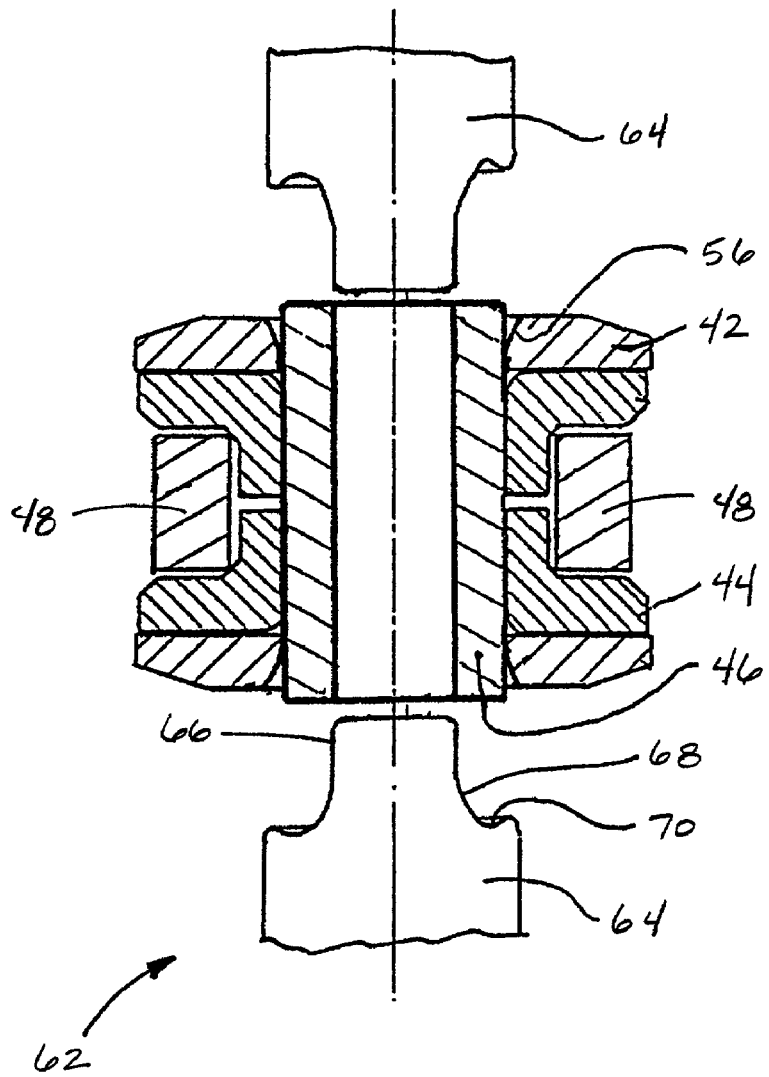
FIG. 6 is a cross-sectional view of a stamping tool being inserted into a pin to expand the ends of the pin.

Referring to FIG. 6, the heads 60 of the pin 46 are deformed by a control press-fit using a stamping tool 62 to produce an interlocking fit with the contour 56. The stamping tool 62 may be fitted into a chain riveting machine. The stamping tool 62 includes two punches 64. Each punch 64 has a specific insertion diameter 66 that allows it be initially inserted into the hollow pin 46. Each punch 64 also has an expansion cone 68 for expanding the heads 60 of the pin 46. The expansion cone 68 is adjacent the insertion diameter 66. Further, each punch 64 has a calibration surface 70 for determining the length of the pin 46 and for making the heads 60 conform to the contour 56 of the hole 52 in the outer link plates 42. In operation, the punches 64 are inserted into the hollow heads 60 of the pins 46, then by a control press-fit the expansion cone 68 widens the heads 60 and at end of the process the length and shape of the heads 60 are calibrated by the calibration surface 70.

Figure 4:
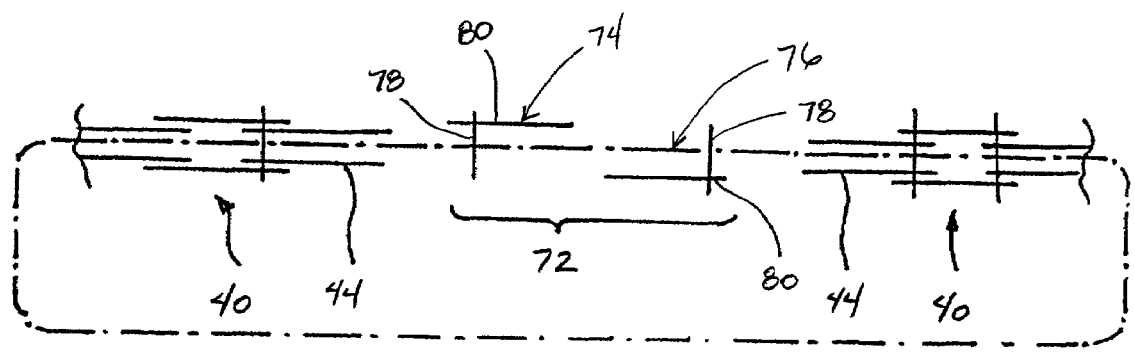
FIG. 4 is a diagram of a closing link between two inner chain links in accordance with a specific embodiment of the present invention.
Figure 5:
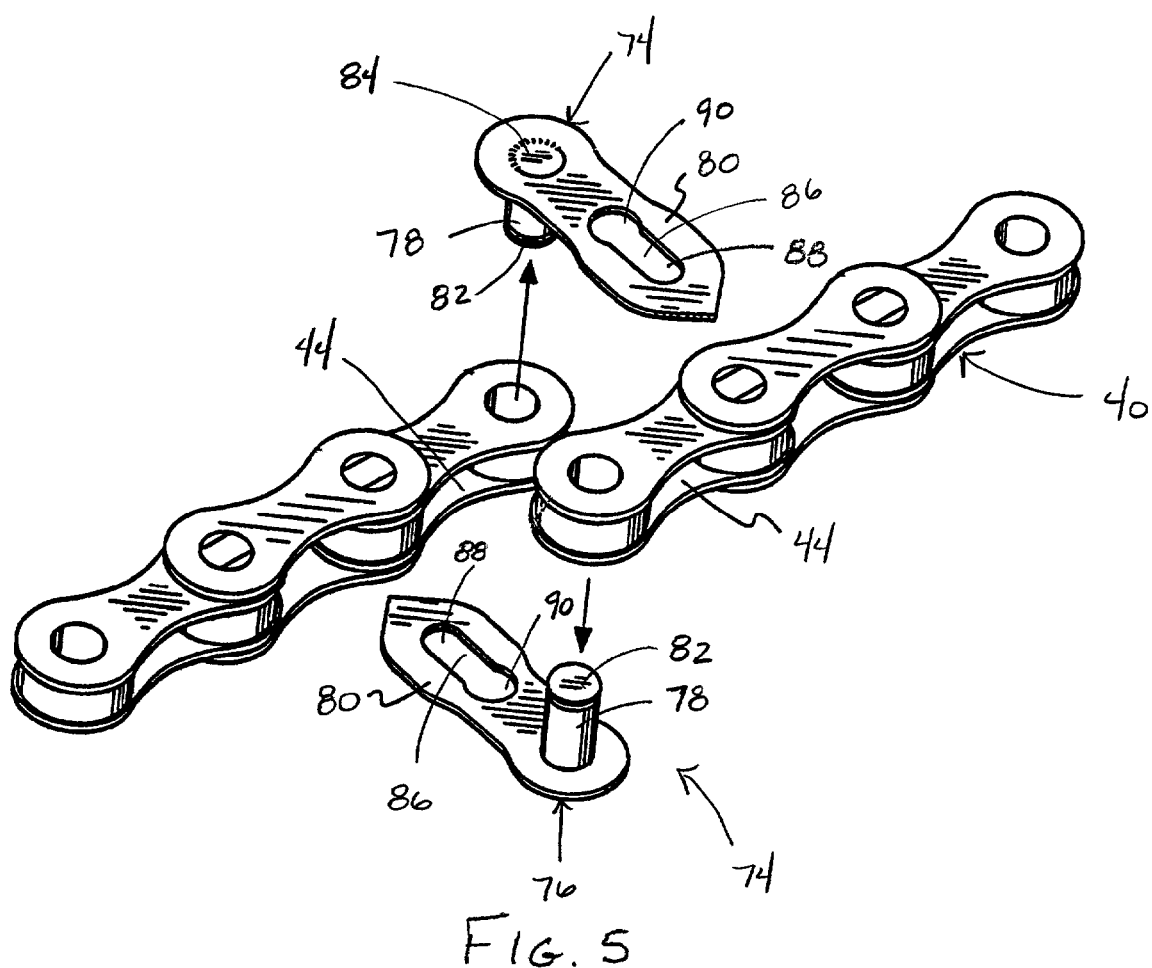
FIG. 5 is a perspective view of the closing link of FIG. 4.

Referring now to FIGS. 4 and 5, a closing link 72 may be used to close the roller chain 40. The closing link 72 is designed in accordance with U.S. Pat. No. 5,362,282. The two inner link plates 44 being situated opposite one another for this purpose. The closing link 72 includes identical two parts 74, 76. Each part 74, 76 includes a closing pin 78 and a closing link plate 80. The first part 74 is connected to the first inner chain link and the second part 76 is connected to the second inner chain link. The closing pins 78 have first and second heads 82, 84. The heads 82, 84 of the closing pins 78 are formed by undercutting. The closing link plates 80 have apertures 86. The apertures 86 have a narrow curvilinear portion 88 which is narrower than the first head 82 to prevent the first head 82 from passing therethrough. The apertures 86 also have a wide curvilinear portion 90 which is wider than the first head 82 to prevent the first head 82 from passing therethrough. To assemble the closing link 72, the first heads 82 of the pins 78 are inserted into the wide curvilinear portion 90 of the aperture and than slide into the narrow curvilinear portion 88. The apertures 86 have embossed locks in which the heads 82 of the pins are detachably anchored.

Figure 16:
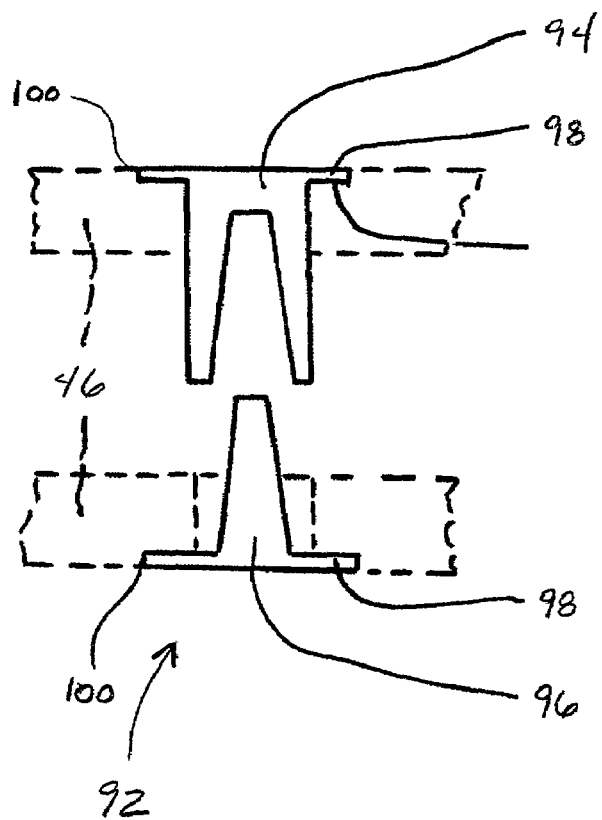
FIG. 16 is a side view of a closing link in accordance with a specific embodiment of the present invention.

Alternatively, a closing link 92 illustrated in FIG. 16 may used to assembly the roller chain 40. The closing link 92 is designed in accordance with French patent, FR2652627 (Reg. Nat. 89 12752). The closing link 92 includes first and second elements 94, 96 which are pressed into one another so as to occupy the same space as the pin 46. To produce a flush edge with the outer link plates 42, the first and second elements 94, 96 may have flat heads 98 which are inserted into indents 100 in the outer link plates 42.

Figure 7:
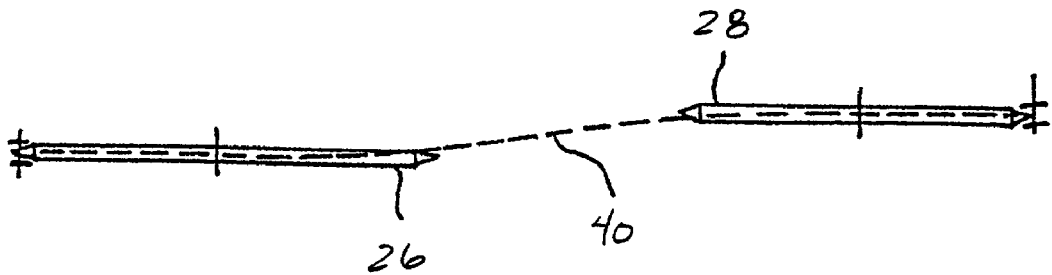
FIG. 7 is a side view of the roller chain on two gears that are not align with one another.

Referring now to FIG. 7, the roller chain 40 follows a curved path when it forms a drive with gears 20 and 21 that do not align with one another. In this instance, the chain links are twisted in the shape of a parallelogram because of the built-in clearance between the outer link plates and the pins. Mobility between the pins and the outer link plates is possible even where the clearance approximates to zero.

FIG. 8 illustrates another embodiment of the present invention, a hole 102 in the outer link plate 42 does not have a contour as shown in FIG. 3, but has a cylindrical section 104 and a tapered section 106 over a specific length 108. The length 108 equals a third of a thickness 110 of the outside link plate 42. The tapered section 106 preferably has an angle between 40° to 60° in order to produce an effective connection with the head 60 of the pin 46.

FIG. 9 illustrates another embodiment, the pin 46 may be pressed in and riveted into the hole of the outer link plate 42. While the pin 46 is being pressed into the hole, the pin 46 is embossed with a tapered angle 112. The tapered angle 112 falls within the range of 55° to 65° to ensure a force-closed contact with the tapered section of the outer link plate. In this embodiment, the faces of the pin heads are modified to have spherically domes inclines. The inclines do not alter the gear shift quality provided that no edge is produced on the external contour of the roller chain.

FIG. 10 illustrates an alternative embodiment of the pin 46. Pin 114 has a solid middle section 116 and depressions 118 at the heads 120 of the pin 114. Preferably, the heads 120 only have a length 122 equal to the thickness of the outer link plate 42. As a result, the pin 114 can be processed like a typical pin 46 as shown in FIG. 1 made from tube stock. An advantage of this configuration is that the pin 114 is not subject to plastic deformation in the middle area of the solid cross section. No bulging occurs in the middle section 116 as a result of the stamping forces acting on the heads 120 of the pin 114.

FIGS. 11-15 illustrate variations of the pin 46 pressed and riveted into the hole of the outer link plate. In FIG. 12, the head of pin 126 is riveted by an embossment 128 running transversely over a face 130 of the head. The riveting of the pin 126 produces two opposing contact embossings 132 on the tapered section 106 of the hole 102, see FIG. 11. In FIG. 14, the head of pin 134 is riveted by a cruciform embossment 136 which results in four contact embossing 138 on the tapered section 106 of the hole 102. This configuration prevents slight swivel movements in a drive over non-aligning gears 21, 22. The strength achieved is similar to those in all-round riveting.

Figure 15:
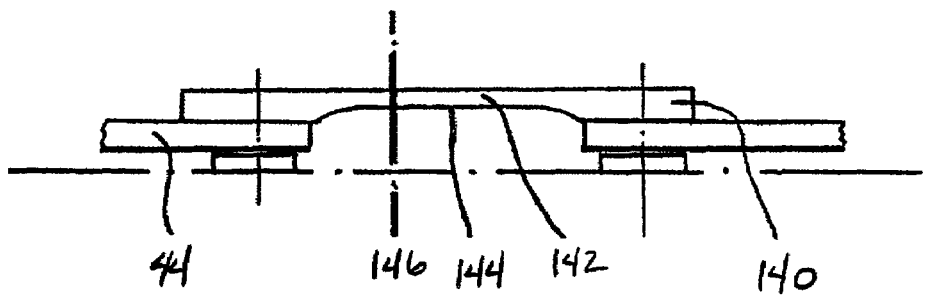
FIG. 15 is a side view of a outer link plate having a narrow middle section facing an inner link plate.

Referring now to FIG. 15, an outer link plate 140 has a middle section 142 with a reduced thickness or indent 144 on a side facing the inner link plate 44. The indent 144 lies in a plane 146 perpendicular to a longitudinal direction of the chain. The indent 144 extends transversely over the area of its narrow middle part 142, in order to achieve or improve the function of the narrow roller chain in the gear shift process. It also helps to improve the function, if the reduced thickness 144 runs over the entire area between the inner link plate 44 and along the plane 146 transversely to the longitudinal direction of the roller chain.

Figure 17:
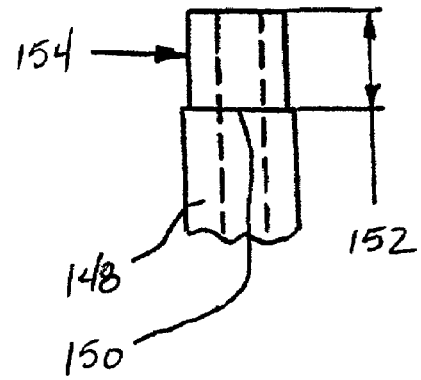
FIG. 17 is a partial side view of a pin having a stop and a reduced diameter for receiving an outer link plate.

FIG. 17 illustrates a pin 148 which has a stop 150 located at a distance 152 from a face of the head of the pin which is an assembly aid for the roller chain. The distance 152 equals to the thickness of the outer link plate 42. The stop 150 separates an outer reduced diameter 154 from the actual normal diameter of the conventional pins 46. When advancing the outer link plates 42 in the automatic assembly machine, the outer link plate 42 reaches its predetermined position when it encounters the stop 150, thereby allowing a measuring sequence to be dispensed with and facilitating the stretching process.

While this invention has been described by reference to several preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A method of assembling a bicycle roller chain having a plurality of outer chain links having outer link plates, a plurality of inner chain links having inner link plates, a plurality of tubular pins joining the outer and inner chain links and having first and second ends, each of the outer and inner link plates having two broader ends, a hole for receiving the tubular pin and a narrower middle part joining the two broader ends, and a plurality of rollers arranged around the pins, the rollers interact with tooth gaps of a tooth system of a least one gear, the holes in the outer chain links having an outwardly-opening conical contour, the pins made from tube stock, the method comprising the steps of:
   assembling the pin in the roller chain;
   providing a stamping tool having first and second punches;
   inserting the first punch into the first end of the tubular pin and the second punch into the second end of the tubular pin;
   deforming the pin heads radially outwardly along the outwardly-opening conical contour of the outer chain links with an expansion cone of the first and second punches; and
   deforming the pin heads axially with a calibration surface of the first and second punches, the calibration surface controlling the depth of penetration of the first and second punches within the tubular pin to define the deformed length of the pin.

2. The method of claim 1 wherein the hole of the outer link plate has a tapered section and a cylindrical section.

3. The method of claim 2 wherein the tapered section has a length equal to one third of a thickness of the outer link plate.

4. The method of claim 2 wherein the tubular pin has a solid middle section and hollow sections at both tubular heads, each of the hollow sections having a length at least equal to a length of the tapered section of the holes of the outer link plates.

5. The method of claim 2 wherein the pin has an embossment running transversely over a face of the head, the embossment joining the pin to the outer link plate, the hole of the outer link plate having two opposing contact embossments produced by surface contact pressure on a periphery of the tapered section of the hole.

6. The method of claim 2 wherein the pin at a minimum of two points on the periphery of the tapered section of the holes is partially widened with a taper so that the pin is joined by surface contact pressure to the outer link plate by way of contact embossments.

7. The method of claim 2 wherein the pin is joined to the outer link plate by a cruciform embossment on a face of the head of the pin resulting in the tapered section having four contact embossments situated symmetrically to one another produced by surface contact pressure on the tapered section.

8. The method of claim 1 wherein the expansion cone is smaller than that required to produce the tapered angle inside the heads and a wobbling motion is used on the punch when deforming the heads of the pins to produce the tapered angle.

9. The method of claim 8 wherein the expansion cone has an angle that tapers from 65° to 55°.

10. The method of claim 1 wherein the outer link plate has a middle section having an indent on a side facing the inner plate, the indent lying in a plane perpendicular to a longitudinal direction of the chain.

11. The method of claim 1 wherein each pin has a stop located at a distance from a face of the head of the pin, the distance equal to the thickness of the outer link plate, an area of the pin in the outer link plate and the hole of the outer link plate having a smaller diameter than a diameter of an area of the pin in the inner link plate and a hole of the inner link plate.

12. The method of claim 1 furthering comprising a closing link joining two inner chain links, the closing link being able to be assembled and dismantled without plastic deformation or press fitting forces on the closing link thereby providing security against the parting of the connection between the pins and the outer link plates under lateral forces.

13. The method of claim 12 wherein the closing link comprises:
   first and second closing pins, each of the first and second closing pins having first and second heads at opposite ends thereof; and
   first and second closing plates, the first and second closing pins extending through the first and second closing plates, the first and second closing plates having respective first and second apertures for receiving the first and second closing pins, the first and second apertures having respective narrow curvilinear portions narrower than said respective first heads to prevent the respective first heads from passing therethrough, the first and second apertures having respective wide curvilinear portions wider than the respective first heads to permit the respective first heads to pass therethrough to dissemble the chain link, said wide curvilinear portions being connected to said respective narrow curvilinear portions to permit movement of said respective first heads therebetween.

14. The method of claim 1 wherein the assembly of the roller chain into a working unit is achieved by means of a closing link, which comprises first and second elements, which when pressed into one another occupy the space of one of the pins and join the inner chain link to the outer chain link.

15. The method of claim 14 wherein at least one of the first and second elements has a flat head inserted into an indent disposed in an exterior surface of the outer chain link corresponding thereto, the inserted flat head flush with the exterior surface of the outer chain link.

16. A method of assembling a bicycle roller chain having a plurality of outer chain links having outer link plates, a plurality of inner chain links having inner link plates, a plurality of tubular pins joining the outer chain links and inner chain links and having first and second ends, the outer and inner link plates each having two broader ends, a hole for receiving the tubular pin and a narrower middle part joining the two broader ends, and a plurality of rollers arranged around the pins, the rollers interact with tooth gaps of a tooth system of at least one gear, the holes of the outer link plates having an outward-opening conical contour, the pins made from tube stock, the method comprising the steps of:
   assembling the pin in the roller chain;
   providing a stamping tooling having first and second punches;
   inserting the first punch into the first end of the hollow pin and the second punch into the second end of the hollow pin;
   deforming the pin heads radially outwardly along the outwardly-opening conical contour of the outer chain links with an expansion cone of the first and second punches; and
   deforming the pin heads axially with a calibration surface of the first and second punches, the calibration surface controlling the depth of penetration of the first and second punches within the tubular pin to define the deformed length of the pin,
   the holes of the outer link plates and deformed heads of the pins having a configuration such that the deformed heads of the pins upon installation are allowed to slightly move within the holes of the outer link plates.

17. The method of claim 16 wherein the slight movements lead to a displacement of a rectangle, formed by two pins and two outer link plates, to form a parallelogram.

18. The method of claim 16 wherein the slight movements occur due to a clearance located at the greatest diameter of the hole.

19. The method of claim 18 wherein the clearance is zero when other sections between the hole and the head of the pin have a press fit.

20. The method of claim 16 wherein the holes have an outward-opening conical contour for receiving the heads of the pins.

21. The method of claim 16 wherein the pins has an embossment running transversely over a face of the head, the embossment joining the pin to the outer link plate and the hole of the outer link plate having two opposing contact embossments produced by surface contact pressure on a periphery of the tapered section of the hole.

22. The method of claim 16 wherein the phi at a minimum of two points on the periphery of the tapered section of the holes is partially widened with a taper so that the pin is joined by surface contact pressure to the outer link plate by way of contact embossments.

23. The method of claim 16 wherein the pin is joined to the outer link plate by an cruciform embossments on a face of the head of the pin resulting in the tapered section having four contact embossments situated symmetrically to one another produced by surface contact pressure on the tapered section.

24. The method of claim 16 wherein when pressed in, the pin finishes flush with the outer surface of the outer link plates.

* * * * *